3,082,213
PHTHALOCYANINE DYESTUFFS
Andre Pugin and Jakob Bindler, Riehen, near Basel, Switzerland, assignors to J. R. Geigy A.-G., Basel, Switzerland
No Drawing. Filed Dec. 9, 1960, Ser. No. 74,783
Claims priority, application Switzerland Dec. 10, 1959
4 Claims. (Cl. 260—299)

The present invention concerns water insoluble dye salts of the phthalocyanine series, processes for the production thereof, their use for the production of inks, in particular of inks for ball point pens and stamp pads, and, as industrial product the inks produced by the aid of these dyestuffs.

The new dye salts correspond to the general Formula I

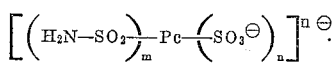

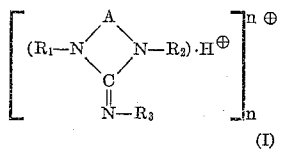

(I)

In this formula

Pc represents the radical of a phthalocyanine. This is either metal-free or, preferably, metal-containing, in particular containing heavy metal and, of these, principally copper. In addition to the sulphonyl substituents, the benzo radicals of the phthalocyanine dyestuff may contain at most some halogens, in particular some chlorine atoms, A represents a saturated hydrocarbon radical bound at $\alpha,\beta$- or $\alpha,\gamma$-carbon atoms to the two nitrogen atoms. Advantageously A is an alkylene radical, in particular an $\alpha,\beta$-alkylene radical, principally the 1,2-ethylene radical. However, A can also be an $\alpha,\gamma$-alkylene radical, preferably the 1,3-propylene radical.

At least one R of $R_1$, $R_2$ and $R_3$ represents a lipophilic radical, a further R of $R_1$, $R_2$ and $R_3$ represents hydrogen and the third of R of $R_1$, $R_2$ and $R_3$ represents hydrogen, an aliphatic, cycloaliphatic, araliphatic or aromatic radical. Advantageously only one R, in particular $R_1$ or $R_2$, represents a lipophilic radical, principally an aliphatic, saturated group, advantageously an alkyl group having at least 10 C atoms, in particular the decyl, dodecyl and tetradecyl group. It is also possible for this R to be an araliphatic group such as, e.g. a benzyl group which can contain saturated aliphatic substituents such as, e.g. tert. butyl, tert. amyl, octyl, iso-octyl, decyl and dodecyl groups. The two remaining R's are advantageously hydrogen; but one of these two R's, particularly $R_2$ or $R_1$, can also represent an organic radical, preferably an alkyl group such as, e.g. the methyl, ethyl, propyl, butyl, amyl, hexyl, octyl, 3,5,5-trimethylhexyl, decyl, or dodecyl group or also a cycloalkyl group. All the N-substituents together have advantageously at least 9 C atoms.

$m$ and $n$ each represent a positive whole number; the sum thereof is 2 to 3.

The dye salts of the phthalocyanine series of the general Formula I are produced by reacting one mol of a phthalocyanine sulphonic acid-sulphonic acid amide of the general Formula II

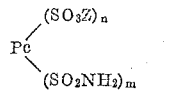

(II)

wherein

Pc, $n$ and $m$ have the meanings given above, and
Z represents a monovalent cation, preferably hydrogen, an alkali metal or ammonium ion, with $n$ mol(s) of a compound of the general Formula III

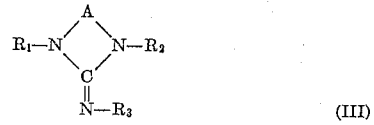

(III)

wherein A, $R_1$, $R_2$ and $R_3$ have the meanings given in Formula I, to form a water insoluble amine salt of a phthalocyanine sulphonic acid containing sulphamide groups.

In the reaction of the phthalocyanine compound of the Formula II with the imino-di-N-heterocyclic compound of the general Formula III, the latter is advantageously in the form of its acid salt, preferably in the form of a hydrohalide, particularly the hydrochloride or hydrobromide and the reaction is performed in aqueous solution or suspension, possibly with the addition of inert organic solvents which are miscible with water, such as, e.g. acetone.

Instead of a single compound of the Formulae II and III, also technical mixtures can be used, the components of which correspond to the Formula II or III. Particularly valuable dye salts of the phthalocyanine series are obtained from such mixtures in which $n$ and $m$ in Formula II each have an average value of 0.7 to 1.5.

The starting products of the general Formula III are obtained by various methods which are known per se.

Thus, the 1- or 1,3- substituted 1,3-di-N-heterocyclic compounds of the general Formula IV

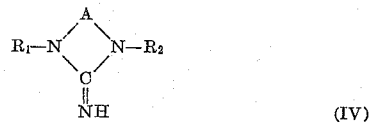

(IV)

wherein $R_1$ and $R_2$ have the definitions given above, are obtained, e.g. by reacting the corresponding N- or N,N'-substituted alkylenediamines with cyanogen halide, in particular with cyanogen chloride, advantageously in an inert solvent while cooling.

The 1-substituted 1,3-di-N-heterocyclic compounds the 2-imino group of which is N-substituted of the general Formula V$a$ or the tautomeric Formula V$b$

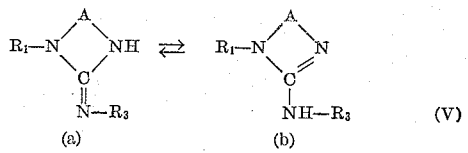

(V)

wherein $R_1$ has the meaning given in Formula I and $R_3$ has the meaning defined with the exception of hydrogen, are obtained, for example, by reacting the thioether produced by a method known per se of the general Formula VI

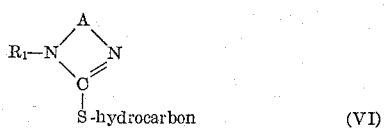

(VI)

wherein $R_1$ has the meaning given in Formula I and the hydrocarbon radical is preferably a low alkyl group, in particular the methyl group, with a primary amine of the general Formula VII

(VII)

wherein $R_3$ has the meaning defined—with the exception of hydrogen—while splitting off hydrocarbon mercaptan. The reaction is performed in inert solvents, in particular in low alkanols such as, e.g. methanol, at the boil.

The finished dye salts of the Formula I, which are in dispersion form, can easily be filtered off and purified by washing with water. They are blue-black powders which are insoluble in water and difficulty soluble in low alkanols such as, e.g. methanol or ethanol, and in low ketones such as, e.g., acetone. On the other hand they are easily soluble in several higher alcohols such as, e.g. benzyl alcohol or in several ether alcohols such as, e.g. in diethylene glycol monoalkyl ethers, for example in diethylene glycol monoethyl ether.

A particularly good class of water insoluble dyestuffs according to this invention corresponds to the general formula

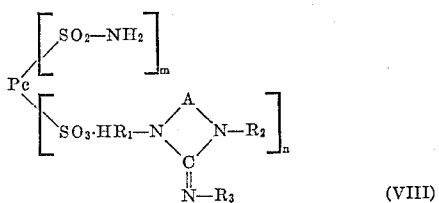

(VIII)

wherein

Pc is a radical of a metal-containing phthalocyanine, the metal having an atomic number of 27 to 29 inclusive, i.e. cobalt, nickel and copper respectively, one of said symbols $R_1$, $R_2$ and $R_3$ is an alkyl group containing 8–14 carbon atoms, one of said symbols $R_1$, $R_2$ and $R_3$ is hydrogen, one of said symbols $R_1$, $R_2$ and $R_3$ is a member selected from the group consisting of hydrogen, an alkyl containing 1–12 carbon atoms, benzyl and cyclohexyl, A is a member of the group consisting of —$CH_2$—$CH_2$— and —$CH_2$—$CH_2$—$CH_2$— and $m$ and $n$ are each positive whole numbers with the limitation that the sum of $m+n$ must be at least 2 and at most 3.

The water insoluble dyestuff of Formula VIII wherein Pc is a radical of copper phthalocyanine, A is

—$CH_2$—$CH_2$—

$R_1$ is an alkyl radical containing 10–14 carbon atoms and $R_2$ and $R_3$ each represent hydrogen are particularly valuable.

Inks for ball point pens and stamp pads which contain the dyestuffs produced according to the invention are distinguished by the very good fastness of the impressions made therewith to water, low alkanols, acetone, ether, hydrochloric acid, caustic soda lye, aqueous ammonia, sodium hypochlorite, potassium permanganate and sodium bisulphite. In addition they are very fast to light. If desired, they can also contain other fast dyestuffs in order to attain the desired shade, for example, gas black.

The following examples illustrate the invention. Parts are given therein as parts by weight. The temperatures are in degrees centigrade. The relationship of parts by weight to parts by volume is as that of grammes to cubic centimetres.

*Example 1*

14.9 parts of a mixture consisting chiefly of copper phthalocyanine monosulphonic acid-monosulphonamide (produced by heating 100 parts of copper phthalocyanine in 800 parts of chlorosulphonic acid for 2 hours at 115° and treating the sulphochloride formed with ammonia), and 3 parts of sodium carbonate are dissolved at 40° in 600 parts of water and the mixture is precipitated by the addition of 170 parts of a solution of 28.8 parts of 1-dodecyl-2-iminoimidazolidine hydrochloride (produced by reacting N-dodecyl-1,2-diaminoethane with cyanogen chloride in chlorobenzene) in 500 parts of water. The flaky blue dyestuff so obtained is filtered off, washed with the solution of 0.5 parts of 1-dodecyl-2-iminoimidazolidine hydrochloride in 500 parts of water and dried at 80°. 20 parts of a blue powder are isolated. The powder only dissolves a little in ethanol and acetone but dissolves very well in benzyl alcohol.

Dyestuffs of a somewhat more green shade but having very similar properties are obtained if in this example the copper phthalocyanine sulphonic acid sulphonamide is replaced by the cobalt or nickel phthalocyanine monosulphonic acid monosulphonamide.

If the 1-dodecyl-2-iminoimidazolidine hydrochloride is replaced by 1-decyl- or 1-tetradecyl-2-iminoimidazolidine hydrochloride (produced from N-decyl- or tetradecyl-ethylenediamine and cyanogen chloride), then blue dyestuffs having very similar properties are obtained.

*Example 2*

The solution of 10 parts of 1-octyl-2-imino-3-propyl-imidazolidine hydrobromide in 200 parts of water is added dropwise to a solution of 14.9 parts of a mixture consisting mainly of copper phthalocyanine monosulphonic acid monosulphonamide and 3 parts of sodium carbonate in 800 parts of water until the blue dyestuff has completely precipitated in flaky form. The dyestuff is filtered off, washed with 500 parts of water and dried at 80°. 20 parts of a blue powder are isolated. The powder does not dissolve well in ethanol and acetone but dissolves well with a blue colour in benzyl alcohol and diethylene glycol monoethylether.

Dyestuffs having very similar properties are obtained if, instead of the 10 parts of 1-octyl-2-imino-3-propyl-imidazolidine hydrobromide, 11.7 parts of 1-dodecyl-2-imino-3-isobutylimidazolidine hydrobromide, 12.5 parts of 1 - dodecyl-2-imino-3-cyclohexylimidazoline hydrobromide or 12.7 parts of 1-dodecyl-2-imino-3-benzyl-imidazolidine hydrobromide are used.

The imidazolidine derivatives used in this example are produced by reacting cyanogen bromide with the corresponding (formed) N-alkyl-N'-alkyl- or N-alkyl-N'-aralkyl- or N-alkyl-N'-cyclohexyl - 1,2 - diamino ethanes.

*Example 3*

The solution of 9 parts of 1-dodecyl-2-iminoimidazolidine hydrochloride and 4.5 parts of 1,3-bis-dodecyl-2-iminoimidazolidine hydrochloride in 200 parts of water is slowly added dropwise to a solution of 20 parts of a mixture of copper phthalocyanine mono- and di-sulphonic acid monosulphonic acid amide and copper phthalocyanine monosulphonic acid-disulphonic acid amide (produced by heating 100 parts of copper phthalocyanine in 900 parts of chlorosulphonic acid for 3 hours at 120° and reacting the copper phthalocyanine sulphonic acid-sulphonic acid chloride formed with ammonia) and 3 parts of sodium carbonate in 600 parts of water, until the dyestuff has completely precipitated. The dyestuff is filtered off, washed with a solution of 0.5 part of 1-dodecyl-2-iminoimidazolidine hydrochloride in 1000 parts of water and dried at 80°, whereupon 30 parts of a blue powder are isolated. The powder has properties very similar to those of the dyestuff described in the first paragraph of Example 1.

The mixture of about ⅔ part by weight of 1-dodecyl-2-imino-imidazolidine and about ⅓ part by weight of 1,3-bis-dodecyl-2-imino-imidazolidine is formed in the reaction of the technical mixture of N-dodecyl-1,2-diamino-ethane and N,N'-bis-dodecyl-1,2-diaminoethane with cyanogen chloride.

*Example 4*

The solution of 9.7 parts of 1-decyl-2-imino-hexahydropyrimidine hydrobromide in 100 parts of water is added to the solution of 14.9 parts of a mixture consisting mainly of copper phthalocyanine monosulphonic acid-monosulphonamide (produced by heating 100 parts of cobalt phthalocyanine in 800 parts of chlorosulphonic acid at 125° for 45 minutes and reacting the cobalt phthalocyanine sulphonic acid-sulphonic acid chloride formed with ammonia) and 3 parts of sodium carbonate in 800 parts of water, until the dyestuff has completely precipitated in flaky form. The dyestuff is then filtered off, washed with 500 parts of water and dried at 80° whereupon 20 parts of a blue-black powder are obtained. This powder is difficultly soluble in ethanol and acetone but it dissolves well in dimethyl formamide or benzyl alcohol with a blue colour.

Dyestuffs having similar properties are obtained if, instead of the 9.7 parts of 1-decyl-2-imino-hexahydropyrimidine hydrobromide, 11.0 parts of 1-dodecyl-2-imino-hexahydropyrimidine hydrobromide, 11.7 parts of 1-tetradecyl-2-imino-hexahydropyrimidine hydrobromide, 9.5 parts of 1-octyl-2-imino-3-methyl-hexahydropyrimidine hydrobromide, 12.3 parts of 1-dodecyl-2-imino-3-cyclohexyl-hexahydropyrimidine hydrobromide, 12.5 parts of 1-dodecyl-2-imino-3-benzyl-hexahydropyrimidine hydrobromide or 11.5 parts of 1-dodecyl-2-imino-3-methyl-hexahydropyrimidine hydrobromide are used. The hexahydropyrimidine derivatives used in this example are produced by reacting cyanogen bromide with the corresponding 1,3-diaminopropanes.

If the cobalt phthalocyanine sulphonic acid-sulphonic acid amide is replaced by the nickel or copper phthalocyanine sulphonic acid-sulphonic acid amide, then dyestuffs having very similar properties are obtained.

*Example 5*

14.9 parts of a mixture consisting mainly of copper phthalocyanine monosulphonic acid-monosulphonamide are dissolved in 800 parts of water with 3 parts of sodium carbonate and the mixture is precipitated by the addition of a solution of 10 parts of 2-dodecylamino-imidazolidine hydrochloride in 100 parts of water. The dyestuff is filtered off, washed with water and dried at 60° whereupon 20 parts of a blue powder are isolated. The powder dissolves well in benzyl alcohol.

A similar dyestuff is obtained on using 10 parts of 2-decylamino-imidazolidine hydrochloride.

The 2-dodecyl- or 2-decyl-amino-imidazoline hydrochloride is produced by reacting 2-methylmercapto-imidazoline with dodecylamine or decylamine.

*Example 6*

30 parts of the dyestuff produced according to the first paragraph of Example 1 are dissolved at 120° in 12 parts of octylene glycol and 38 parts of benzyl alcohol. Used as ink for ball point pens, this deep blue solution produces blue impressions which have very good fastness to water, spirits, acetone, permanganate, bisulphite, acid and alkali.

*Example 7*

20 parts of the dyestuff produced according to the first paragraph of Example 2 and 20 parts of "Kunstharz SK" (ketone resin produced by Chem. Werke Hüls, Westphalia, Germany) are dissolved at 100° in 20 parts of octylene glycol and 60 parts of triethylene glycol. The deep blue solution, when used as ink for ball point pens, produces blue impressions which have very good fastness properties for documentary purposes.

What we claim is:
1. A water insoluble phthalocyanine dyestuff of the formula

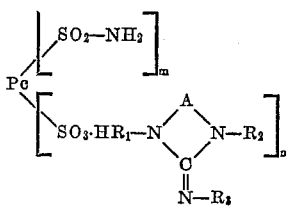

wherein

Pc is the radical of metal-containing phthalocyanine, the metal being a member selected from the group consisting of copper, cobalt and nickel, one of said symbols $R_1$, $R_2$ and $R_3$ is alkyl with 8–14 carbon atoms, another one of said symbols $R_1$, $R_2$ and $R_3$ is hydrogen, and the third one of said symbols $R_1$, $R_2$ and $R_3$ is a member selected from the group consisting of hydrogen, alkyl with 1–12 carbon atoms, benzyl and cyclohexyl, A is a member selected from the group consisting of —$CH_2$—$CH_2$— and —$CH_2$—$CH_2$—$CH_2$—, and $m$ and $n$ are each positive whole numbers with the limitation that the sum of $m+n$ must be at least 2 and at most 3.

2. A water insoluble phthalocyanine dyestuff of the formula

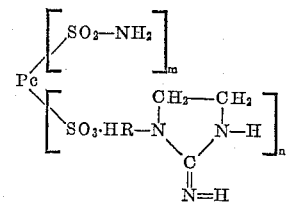

wherein

Pc is the radical of copper phthalocyanine,
R is alkyl with 10–14 carbon atoms,
and $m$ and $n$ are each positive whole numbers with the limitation that the sum of $m+n$ must be at least 2 and at most 3.

3. The water insoluble phthalocyanine dyestuff of the formula

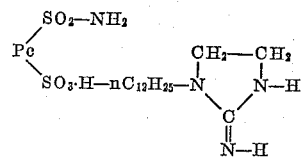

wherein Pc is the radical of copper phthalocyanine.

4. The water insoluble phthalocyanine dyestuff of the formula

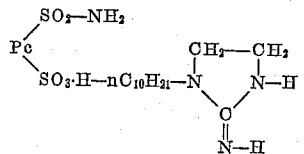

wherein Pc is the radical of copper phthalocyanine.

References Cited in the file of this patent
UNITED STATES PATENTS
2,315,870     Nadler et al. _____ Apr. 6, 1943

OTHER REFERENCES

Venkataraman: Synthetic Dyes, volume II, Academic Press, New York (1952), page 1136.

Lubs: Chemistry of Synthetic Dyes and Pigments, New York (1955), Reinhold, pages 611 and 612.